Jan. 13, 1959  W. E. W. NICOLLS  2,868,383
FILTERS

Filed Jan. 10, 1957  2 Sheets-Sheet 1

Inventor
W. E. W. Nicolls
By Glascock Downing Seebols
Attys.

Jan. 13, 1959  W. E. W. NICOLLS  2,868,383
FILTERS

Filed Jan. 10, 1957  2 Sheets-Sheet 2

Inventor
W.E.W.Nicolls
By Glascock Downing Seebold
Attys

United States Patent Office 2,868,383
Patented Jan. 13, 1959

2,868,383
FILTERS

Wilfrid Edward Walter Nicolls, Pinner, England, assignor to C. A. V. Limited, London, England Application January 10, 1957, Serial No. 633,491

Claims priority, application Great Britain January 13, 1956

1 Claim. (Cl. 210—323)

This invention relates to liquid fuel or other filters of the kind in which the liquid to be filtered can flow through the filtering means from an entrance at one end to an outlet at the other end, and particularly of the said kind in which the filtering means consists of a folded or double paper strip coiled to a spiral form, the said means being enclosed in a vessel having appropriate inlet and outlet passages.

Such filters are required in a variety of sizes, but for convenience of manufacture it is desirable to form the filtering means as units of a standardised size suitable for a filter of the smallest size within a given range, and the object of the present invention is to enable a filter of any desired size to be constructed from a plurality of the standardised filtering units.

A filter in accordance with the invention includes at least two similar filtering units arranged coaxially with a space between their adjacent ends, a perforated band embracing the said ends so that the liquid can flow through the two units in parallel, and an axially arranged tube interconnecting the central parts of the adjacent ends of the units.

Figure 1:
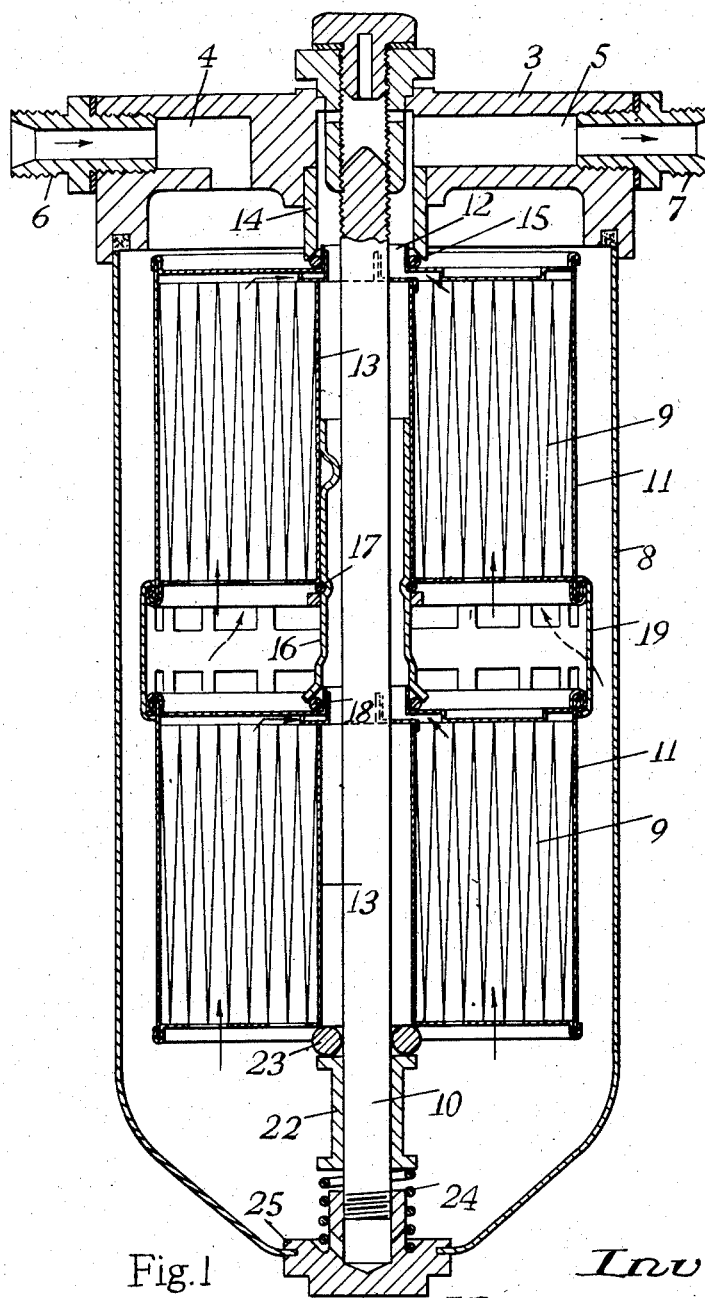
Figure 2:
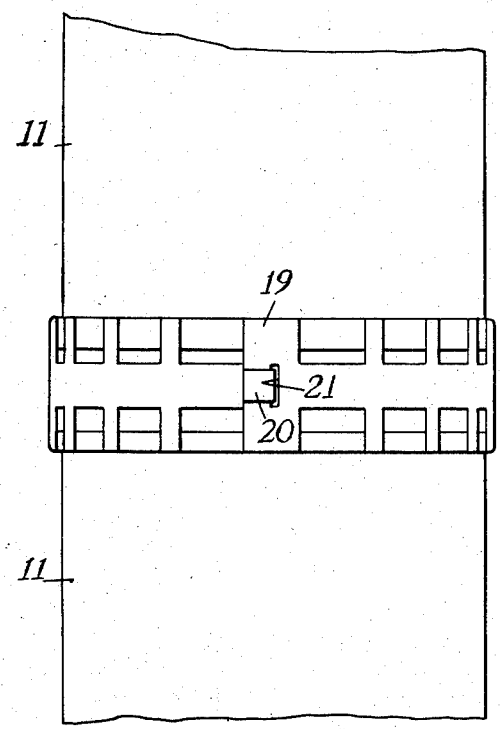

In the accompanying drawings, Figure 1 is a sectional side elevation of a filter in accordance with the invention for use as a fuel oil filter on an internal combustion engine, and Figure 2 is a fragmentary view of the perforated band for interconnecting the adjacent ends of a pair of filtering units.

Referring to the drawings, the body part of the filter comprises a hollow top plate or cover 3 having therein a fuel-oil inlet passage 4 and outlet passage 5, these being provided with any convenient pipe connections 6, 7 as shown. To the underside of the cover is removably attached a metal or other cylindrical vessel 8 for containing a pair of filtering units 9, the vessel being secured to the cover by an axial stem 10. Each filtering unit consists of a folded or double paper strip coiled to a spiral form so as to provide alternate inflow and outflow passages, the coil being contained in a thin sheet metal cylindrical case 11 which is closed at its upper end and has a central spigot 12 extending from the said end. The lower end of each case is perforated. Also each filtering unit 9 has a thin tube 13 extending along its centre.

The spigot 12 at the upper end of the upper unit is inserted into the entrance end of a socket 14 leading to the outlet passage 5 in the cover and is embraced by a rubber or rubber like sealing ring 15. On the spigot at the upper end of the lower filtering unit is placed a coupling tube 16 which enters the lower end of the central tube of the upper unit. A sealing ring 17 is placed on the coupling tube in contact with the said central tube, and another sealing ring 18 is placed around the spigot of the lower unit.

The adjacent ends of the two units are spaced at a convenient distance apart, and the adjacent ends of the two cases 11 are embraced by a perforated metal band 19 shaped to engage circumferential lips on the cases. The ends of the band are secured together by a tag 20 on one end of the band which can be inserted through a slot 21 at the other end and folded over as shown in Figure 2.

On the lower end of the above mentioned central stem 10 is placed a sleeve 22, and a sealing ring 23 is placed between one end of the sleeve and the adjacent end of the central tube 13 of the lower unit, the sleeve being held in contact with the ring by a spring 24 situated between the lower end of the sleeve and a nut 25 which is attached to the lower end of the enclosing vessel 8 and is in screw thread engagement with the stem.

The arrangement is such that fuel entering the vessel can flow through the two units in parallel. Fuel entering the lower end of the lower unit passes upwardly to the closed upper end of its case and thence flows out through the associated spigot to the central tube of the upper unit, and to the outlet passage in the cover. Fuel entering the space between the two units through the perforated band flows in like manner through the upper unit and thence through the spigot of its case to the said outlet.

When a filter of larger size is required, another or two or more other filtering units are mounted coaxially and in like manner within a vessel of appropriate size, the pairs of adjacent ends of the series of units being embraced by perforated bands so that all the units can operate in parallel. But in all arrangements the units employed are of the same size, thus enabling the manufacture of the filtering units to be simplified.

Having thus described my invention what I claim as new and desire to secure by Letters Patent is:

A liquid filter comprising in combination a cylindrical vessel adapted to occupy a vertical position and having a closed lower end, a cover closing the upper end of the vessel and provided with an inlet and outlet for the liquid to be filtered, at least two similar filtering units of cylindrical form arranged one above the other in coaxial relationship within the vessel, with the outer peripheries of the units spaced from the adjacent parts of the vessel, the adjacent ends of the units spaced from each other, and the upper end of the upper unit and the lower end of the lower unit spaced from the cover and the lower end of the vessel respectively, each unit having a cylindrical case provided with a perforated lower end for the admission of liquid to the unit, and with an upper end closed apart from a central opening for the exit of liquid from the unit, a filtering medium contained in the case and consisting of a double thickness of paper strip spirally coiled to provide alternate inflow and outflow passages for liquid admitted to the casing, and an axially arranged tube surrounded by the spirally coiled paper strip, another axially arranged tube interconnecting the central parts of the adjacent ends of the two units, a perforated band enclosing the space between, and removably embracing, the adjacent ends of the two units, and means supporting the units within the vessel so that liquid admitted to the vessel through the inlet can flow upwardly through the two units in parallel to the outlet.

References Cited in the file of this patent

UNITED STATES PATENTS

| | | |
|---|---|---|
| 2,313,307 | Wilkinson | Mar. 9, 1943 |
| 2,316,206 | Wilson | Apr. 13, 1943 |
| 2,548,400 | Shepard | Apr. 19, 1951 |
| 2,565,445 | Winslow et al. | Aug. 21, 1951 |

FOREIGN PATENTS

| | | |
|---|---|---|
| 152,799 | Australia | Aug. 12, 1953 |